March 28, 1961  D. D. MURPHY  2,976,982
CONVEYOR APPARATUS

Filed April 25, 1958　　　　　　　　　　　　　　　3 Sheets-Sheet 1

INVENTOR:
DONALD D. MURPHY
BY *E. Wallace Breusch*
ATTORNEY

March 28, 1961 D. D. MURPHY 2,976,982
CONVEYOR APPARATUS

Filed April 25, 1958 3 Sheets-Sheet 2

INVENTOR:
DONALD D. MURPHY
BY
ATTORNEY

March 28, 1961 D. D. MURPHY 2,976,982
CONVEYOR APPARATUS
Filed April 25, 1958 3 Sheets-Sheet 3

INVENTOR:
DONALD D. MURPHY
BY E. Wallace Breust
ATTORNEY

United States Patent Office 2,976,982
Patented Mar. 28, 1961

2,976,982

CONVEYOR APPARATUS

Donald D. Murphy, New Philadelphia, Ohio, assignor to Joy Manufacturing Company, Pittsburgh, Pa., a corporation of Pennsylvania Filed Apr. 25, 1958, Ser. No. 731,015

22 Claims. (Cl. 198—139)

My invention relates to conveyor apparatus and more particularly to conveyor apparatus for automatically permitting substantial changes in the length of the conveying run of an endless movable conveyor belt.

At the present time it is common practice to perform mining operation by means of a movable mining machine which discharges the mined material rearwardly to the conveying run of a movable endless conveyor belt which in turn conveys the mined material to a desired remote location. As can readily be appreciated, the mining machine must continually progress further into the mine in order to continuously mine material which movement requires an increasing amount of conveyor belting to maintain continuous conveying. In many instances it is also desirable that the mining machine be moved in a manner so that the amount of conveyor belt must be decreased to maintain continuous conveying. Various storage machines have been employed which automatically extend and retract the conveyor belt as it is required; however, the total extensible length of the conveyor belts of the prior devices of which I am aware is limited due to the physical size of storage machine which may be conveniently employed in the mine. Accordingly, one object of my invention is to provide new and improved conveyor apparatus for automatically permitting an endless movable conveyor belt to be substantially extended without affecting the conveying operation.

Another object of my invention is to provide new and improved conveyor apparatus having spaced automatically retractable idler structures for supporting a storage length of conveyor belting.

Still another object of my invention is to provide new and improved conveyor apparatus having spaced automatically retractable idler structures for supporting a storage length of a conveyor belting and a reciprocably movable carriage for supporting the reversed end of such storage length and which carriage effects operation of said idler structures.

A more specific object of my invention is to provide new and improved conveyor apparatus having idler structures spaced longitudinally along a storage length of conveyor belting for supporting such belting and which are located outwardly adjacent the sides of the path of movement of a belt supporting carriage, the movement of which causes said idler structures to be displaced from their belt storage position.

Another object of my invention is to provide new and improved conveyor apparatus having an idler structure which is pivotable in opposite directions from a normal belt supporting position.

Still another object of my invention is to provide new and improved conveyor apparatus having an idler structure which is pivotable in opposite directions from a normal belt supporting position and which is biased into such normal position.

A further object of my invention is to provide new and improved conveyor apparatus having a retractable carriage for supporting the reversed end of a conveyor belt storage loop which carriage has guides extending the length thereof located outwardly adjacent the sides thereof, respectively.

Still another specific object of my invention is to provide new and improved conveyor apparatus having a movable conveying run of conveyor belting and a storage loop of the same belting extending from such conveying run which storage loop is movably stored to continuously extend or retract substantial lengths of belting to and from the conveying run.

These and other objects of my invention will become more apparent upon consideration of the following detailed description of a preferred embodiment thereof, when taken in conjunction with the following drawings, in which.

Figure 1:
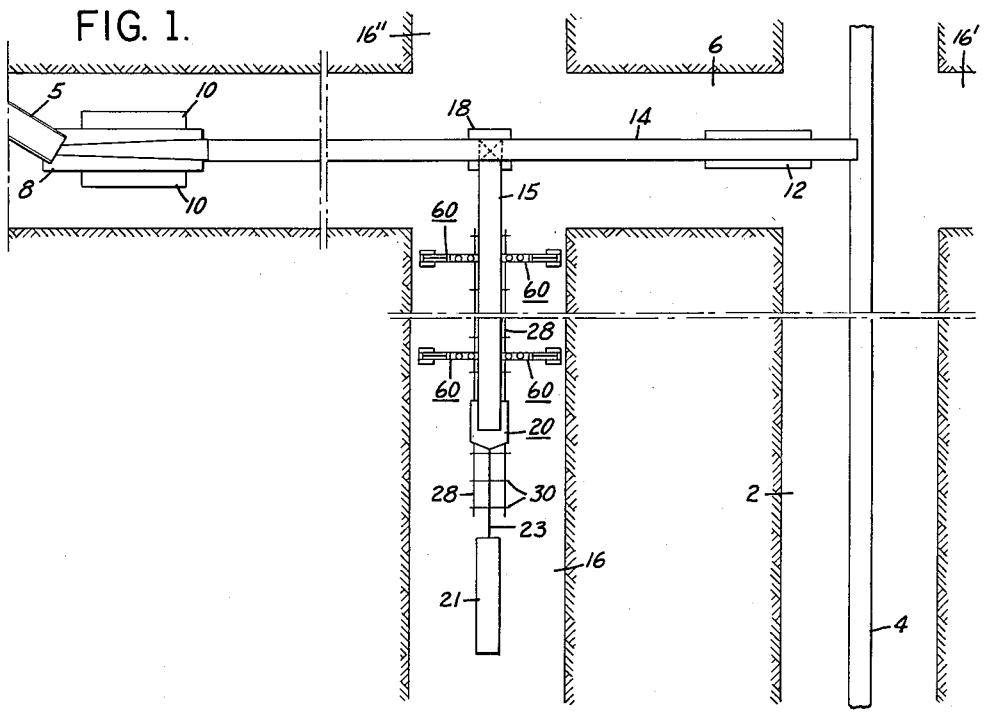
Fig. 1 is a top plan view of a section of a mine having mining apparatus therein including conveyor apparatus constructed in accordance with the principles of my invention.

Fig. 1 illustrates a section of a mine, such as a coal mine, having a mine passageway 2 in which a suitable mine conveyor 4 is supported for conveying mined material discharged thereon to any suitable remote location. An elongated passageway 6 extends laterally outwardly from the passageway 2 in which a suitable tail section 8 is located remote from the passageway 2 to receive mined material from a suitable mining machine located at the inner end of the passageway 6 and of which only the discharge end 5 is shown. The tail section 8 may be of any suitable structure, such as those constructed for continuous mining operation, having suitable means such as side treads 10, for moving the tail section 8 longitudinally and laterally in the passageway 6. The tail section 8 is also provided at the end thereof facing the passageway 2 with a suitable reversing roller (not shown) for continuously receiving and reversing the conveyor belt attached thereto. A suitable conveyor belt driving means 12 is located in the passageway 6 intermediate the conveyor 4 and the tail section 8, preferably closely adjacent the conveyor 4, so that material conveyed thereover may be discharged directly onto the conveyor 4. Inasmuch as the structures of such conveyors 4, mining machines, tail sections 8, and drive means 12 are well known in the art and do not constitute a part of my invention, further description thereof is not believed to be warranted.

As shown, a passageway 16 extends laterally from the passageway 6 intermediate the passageway 2 and the inner end of the passageway 6 for storing additional conveyor belt as needed. It will be realized that the passageways 6 and 16 are suitably formed prior to the installation of the conveyor apparatus of my invention as hereinafter described. As shown a belt conveyor turn unit 18 is located in the passageway 6 in alignment with the passageway 16 to continuously discharge a lower storage run 17 of conveyor belt into the passageway 16 and to continuously receive an upper storage run 15 of conveyor belt from a movable carriage 20 located inwardly of the passageway 16 remote from the turn unit 18 and in alignment therewith. In order to insure proper operation of the carriage 20, the carriage 20 is connected by suitable means, such as a cable 23, to a suitable tensioning unit 21, such as a hydraulic tensioning unit, whereby a substantially uniform counter pressure is exerted on the carriage 20 opposite that normally exerted by the moving runs 15 and 17 and which counter pressure is sufficient to properly tension the runs 15 and 17. Inasmuch as the turn unit 18 does not constitute a part of my invention any suitable structure therefor may be employed which receives an initial lower return run (not shown) of conveyor belt discharged from the driving means 12 which lower return run is guided and changed in direction to discharge the run 17 to the carriage 20. The inwardly traveling run 17 is reversed in direction by means of a reverse roller 22 (see Fig. 2) rotatably supported on the carriage 20 to form the forwardly traveling upper storage run 15. The run 15 is then received by the turn unit 18 to change its direction to provide a lower return run of conveyor belt to the outer end of the tail section 8 which run is then reversedly guided over the reversing roller of the tail section 8 to form a conveying run 14 which travels from the tail section 8, over the turn unit 18, over the driving means 12 to the conveyor 4 to discharge thereon. The conveying run 14 is then guided by a reversing roller (not shown) on the driving means 12 to form the initial lower return run. Thus, it will be noted that the conveyor belt is continuous for all of such runs with the various upper and lower runs extending in the same direction being generally parallel to each other. For the purposes of my invention it is immaterial whether the roller 22 reverses the belting so that the upper run 15 is traveling towards or away from the turn unit 18.

Figure 2:
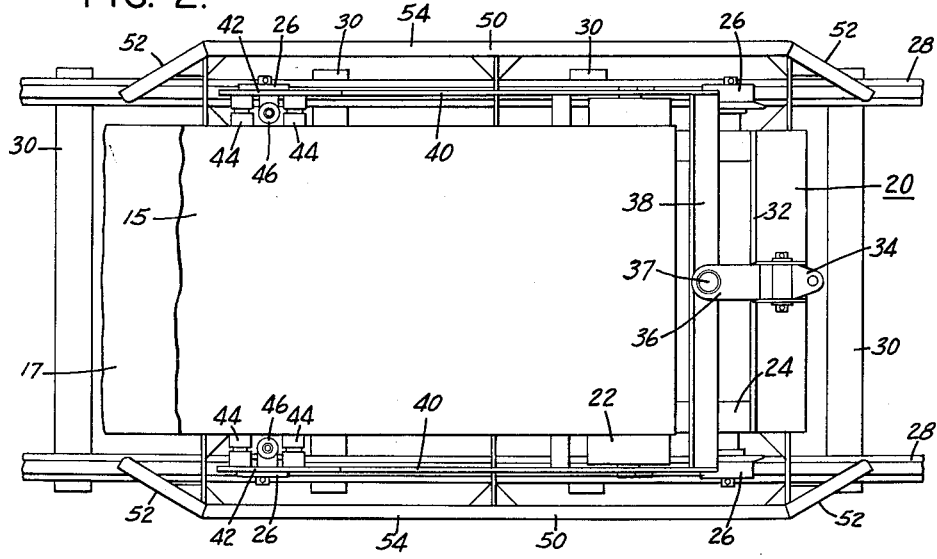
Fig. 2 is a top plan view of a movable carriage incorporated in the conveyor apparatus as shown in Fig. 1.
Figure 3:
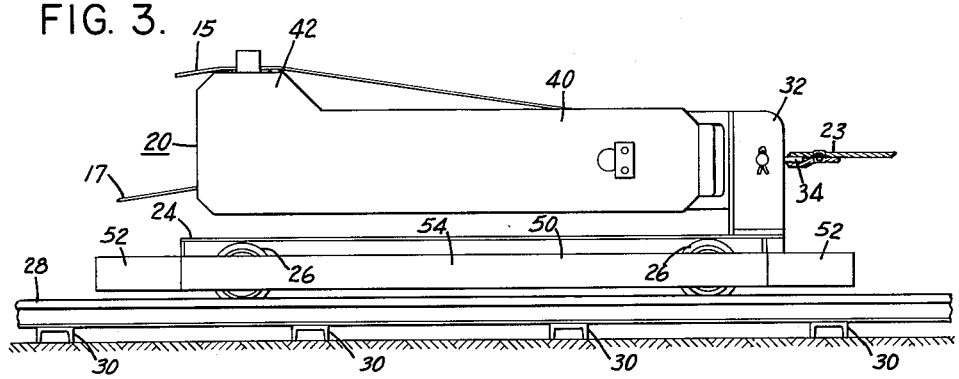
Fig. 3 is a side elevational view of the carriage as shown in Fig. 2.

As shown in Figures 2 and 3 the carriage 20 comprises a suitable rectangular frame 24 having a pair of suitable wheels 26 suitably rotatably supported in spaced relationship at each side thereof. In order to provide a fixed path of movement for the carriage 20 the wheels 26 are flanged to engage the inner adjacent surfaces of parallel rails 28 which are supported on the base or floor of the passageway 16 to extend longitudinally thereof. As heretofore indicated the storage runs 15 and 17 of conveyor belt overlap one another and accordingly the rails 28 are of a length slightly greater than half the length of belting which it is desired to store in order to provide for sufficient reciprocable movement of the carriage 20. If desired the rails 28 may be rigidly secured to suitable cross braces such as inverted U-shaped channels 30 which have the outer ends of their arms engaging the floor of the passageway 16.

As shown an upwardly extending formed support 32 is rigidly secured to the frame 24 of the carriage 20 to extend laterally between the back wheels 26 of the carriage 20. The support 32 is also spaced slightly outwardly from the back wheels 26 towards the inner end of the passageway 16. A suitable cable hitch 34 is centrally rigidly secured to the support 32 to extend rearwardly therefrom and to which the end of the cable 23 remote from the tensioning unit 21 is rigidly secured in any suitable well known manner. A pivot support 36 is also centrally rigidly secured to the support 32 in any suitable manner which extends forwardly therefrom and which is suitably pivotably connected to the laterally extending bight portion 38 of a pivot U-shaped frame by means of a suitable pivot pin 37. Elongated arms 40 are rigidly secured to the ends of the bight portion 38 respectively, in any suitable manner to extend forwardly therefrom above the frame 24 and which are laterally spaced from each other to permit the runs 15 and 17 to pass longitudinally therebetween. The roller 22 is rotatably secured to the arms 40 adjacent the bight portion 38 in any suitable manner whereby due to the pivotable movement of the U-frame misalignment of the runs 15 and 17 with respect to the carriage 20 may be compensated for.

In order to obtain a lifting action of the run 15 as hereinafter described the forward portion of each arm 40 is provided with an upwardly extending portion 42 between which longitudinally spaced laterally extending elongated idler rollers 44 are rotatably supported in any suitable manner. Such idler structures are employed to engage the undersurface of the upper run 15 of conveyor belting extending from the roller 22 so as to substantially elevate the run 15 above the intermediate idler structures as hereinafter described. In a similar manner, not shown, suitable idler rollers are secured to the arms 40 adjacent the free end to support the undersurface of the run 17 in alignment with the belt receiving edge of the roller 22. Also, if desired, suitable upwardly extending side rollers 46 may be secured to the arms 40, respectively, adjacent the free ends thereof which are rotatably engageable with the edges of the run 15 and are normally spaced laterally outwardly therefrom. Inasmuch as such idler rollers 44 and side rollers 46 are well known in the art and may be of any suitable structure, further description thereof is not believed to be warranted.

The carriage 20 is also provided with elongated guides 50 which are rigidly secured to the frame 24 outwardly adjacent the sides thereof, respectively. Each end of the guides 50 is sloped inwardly toward the adjacent rail 28 to provide forward and rearward sloping cam surfaces 52 for a purpose as is more fully described hereinafter. The spaced cam surfaces 52 of each guide 50 terminate into the outer side surface 54 of the guide 50. As will become apparent, for the purposes of my invention the outer surface 54 of each guide 50 is spaced outwardly from the outer edge of the adjacent rail 28. Each guide 50 may be of any suitable construction such as by being formed from a U-shaped channel with the outer surface of the bight portion forming the longitudinally extending surface 54 between the sloping cam surfaces 52.

Figure 4:
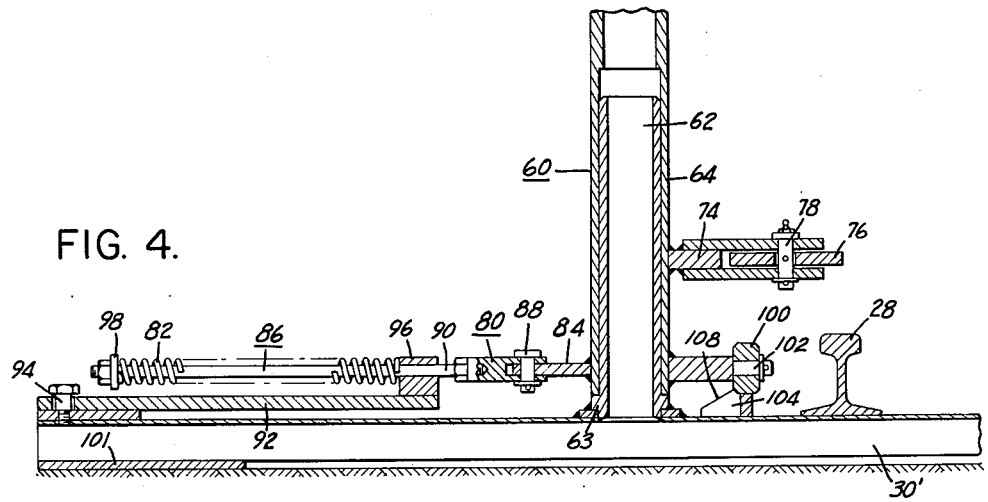
Fig. 4 is a cross sectional view of an automatic idler structure incorporated in the conveyor apparatus as shown in Fig. 1.
Figure 5:
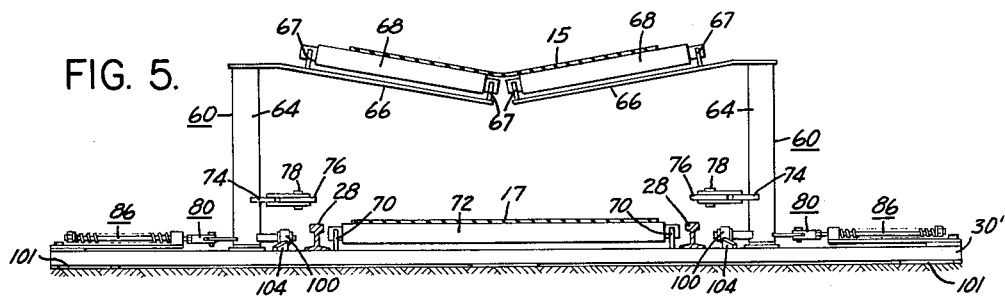
Fig. 5 is a side elevational view of a pair of automatic idler structures as shown in Fig. 4 with the conveyor belt runs and carriage supporting rails being shown in cross section.

As shown in Fig. 5 each side of the upper run 15 is supported by means of a plurality of automatic retractable idlers 60 spaced longitudinally along the runs 15 and 17 and laterally outwardly adjacent the sides of the rails 28. As shown in Figures 4 and 5 each idler 60 comprises an elongated upwardly extending post 62 the base portion 63 of which is rigidly secured to the floor of the passageway 16 in any suitable manner as is well known so as to be fixed with relation to the adjacent rail 28. As shown a cross brace 30' similar to the cross brace 30 heretofore described may be provided to extend laterally outwardly from each rail 28 to provide a base for an idler 60 at the outer side of each of the rails 28. If desired, longitudinally spaced plates 101 may be placed under the arms of the cross brace 30' to elevate the cross brace 30' above the floor of the passageway 16. With such structure the base portion 63 of each idler 60 is secured to the cross brace 30' in any suitable manner such as by being welded thereto.

Each post 62 has an elongated tubular support 64 telescopically received thereabout with its lower end pivotably supported by a suitable flange on the base portion 63 and with its upper end being spaced upwardly above the upper end of the post 62. Each support 64 has one end of an elongated support 66 rigidly secured to its upper end in any suitable manner to extend laterally therefrom above the adjacent rail 28. In the preferred embodiment of my invention shown wherein a pair of idlers 60 are located opposite each other the supports 66 are normally located in lateral alignment with their free ends being spaced from each other. Spaced roller supports 67, having an elongated roller 68 rotatably secured therebetween, are secured to the supports 66 in any suitable manner so that the rollers 68 normally extend longitudinally above the supports 66 to support the undersurface of one side of the upper run 15. Also, as shown, the supports 66 slope downwardly from the supports 64 to support the laterally aligned rollers 68 in a broad V whereby a troughing effect of the upper run 15 is obtained.

In order to support the undersurface of the lower run 17, pairs of spaced brackets 70, each pair having a roller 72 suitably rotatably secured therebetween, are suitably rigidly secured to each cross brace 30' so that the rollers 72 are rotated thereabove. It will be realized that the particular location of the roller 72 as shown is not essential for the purpose of my invention but may be located at any suitable longitudinally spaced location with reference to the lower run 17. It will be noted that the rollers 72 and supports 70 therefor are located between the spaced rails 28 to permit the carriage 20 to travel along the rails 28 with the wheels 26 supporting the frame 24 of the carriage 20 a sufficient distance above the rollers 72 to clear the upper surface of the run 17.

Each idler 60 has a suitable elongated connector bracket 74 rigidly secured at one of its ends to the support 64 in any suitable manner so as to be pivotable therewith. As will become apparent the longitudinal axes of the support 66 and the bracket 74 of each idler 60 are preferably located in the same plane passing through the central longitudinal axis of the support 64. Each bracket 74 has a pair of horizontally extending spaced arms at its outer end between which a circular roller cam 76 is rotatably secured by means of a suitable pivot pin 78 extending therethrough. With such structure the cam 76 is free to rotate in a horizontal plane above the upper surface of the rail 28 adjacent thereto. It will also be noted that the outer edge of the cam 76 is located in alignment with the vertical axis of the rail 28 adjacent thereto.

Each support 64 is normally biased in the above described belt supporting position by means of a toggle mechanism 80 the links of which are biased in alignment with each other by means of a spring 82. As shown each toggle mechanism 80 comprises an elongated link 84 having one end rigidly secured to the support 64 of each idler 60 in any suitable well known manner and which extends laterally outwardly from the support 64 in a direction diametrically opposite that in which the support 66 extends. The outer end of the link 84 is received between spaced arms of an elongated link 86 and is pivotably connected thereto by means of a suitable pivot pin 88 as is well known in the art. As shown, the portion of link 86 extending outwardly from the spaced arm portion comprises an elongated circular shaft 90. Another elongated link 92 is provided for each toggle mechanism 80 which has an end thereof remotely located from the support 64 which is pivotably secured to the cross brace 30' by means of a suitable pivot pin 94. The other end of the link 92 is provided with an upwardly extending block 96 having a suitable bore extending horizontally therethrough in which the shaft 90 is slidably received. It will be noted that the block 96 on link 92 is normally spaced outwardly from the spaced arm portion of the link 86. The shaft 90 normally extends outwardly from the block 96 in overlapping relationship for the greater portion of the length of the link 92 and is of a size to freely receive a suitable elongated helical spring 82 therearound. The spring 82 is of any suitable structure as is well known and has the end thereof remote from the support 64 restricted with relation to the shaft 90 in any suitable manner such as by means of a nut and washer stop 98 suitably secured to the outer end of the shaft 90. With such structure the longitudinal axis of the support 66, the center of the pivotable support 64, the center of the pivot pin 88, and the center of the pivot pin 94 are normally located in alignment with each other.

Upon pivotal movement of a support 64 to either side of its normal position the link 84 is moved away from the link 92 to pull the shaft 90 through the bore in the block 96 so that the spring 82 is compressed. Upon release of the force causing the support 64 to be so pivotably moved the force of the spring 82 against the stop 98 will cause the shaft 90 to move away from the support 64 and consequently the links 92 and 84 to move in the reverse direction to their normal aligned position. If desired, the link 92 may be spaced above the upper surface of the cross brace 30' by means of a suitable spacer plate at its pivotable end thereof through which the pivot pin 94 extends. Also, in order to provide a definite index for each support 64 at its belt supporting position, a roller 100 may be rotatably secured adjacent the support 64 by means of a suitable shaft 102 having one end rigidly secured to the support 64. With such construction the roller 100 is rotatable with the support 64 in a vertically extending arcuate plane extending around the pivot center of the support 64. Indexing cams 104 are secured to the cross brace 30' intermediate the supports 64 and the adjacent rails 28 to extend upwardly from the cross brace 30' into the arcuate path of movement of the rollers 100 respectively. Each side of each cam 104 is provided with an arcuate upwardly extending upper surface 108 in the path of movement of the roller 100 which are connected together by means of a downwardly extending arcuate opening to receive the rollers 100 therein. Although, as shown, the shafts 102 lie in the same plane with reference to the supports 64 as the supports 74 and 66, respectively, if desired, each indexing structure may be disposed at any location about the supports 64. With such an indexing structure the roller 100 is displaced vertically and accordingly the head of the pivot pin 94 is spaced above the upper surface of the link 92 to permit the toggle mechanism 80 to be displaced vertically.

Referring to Fig. 1 it will be noted that for a given position of the tail section 8 the carriage 20 will be tensioned by means of the tensioning means 21 to a given position whereby the runs of belting 14, 15 and 17 and the other heretofore described runs will be continuously running in the directions as heretofore described. As mining operations progress the tail section 8 will be moved forwardly in the passageway 6 so as to require a greater length of conveying run 14. The pull of the tail section 8 is transmitted through the conveyor belting so that the tension in the runs 15 and 17 overcomes the tension exerted by the tensioning means 21 to permit the carriage 20 to travel forwardly towards the turn unit 18. As the carriage 20 travels forwardly the storage runs 15 and 17 will simultaneously be shortened the same distance. The forward movement of the carriage 20 also causes the upper run 15 to be elevated immediately ahead of the carriage 20 so that as the carriage 20 approaches a pair of spaced idlers 60 the run 15 will be elevated above the rollers 68 carried by the approached idlers 60.

Figure 6:
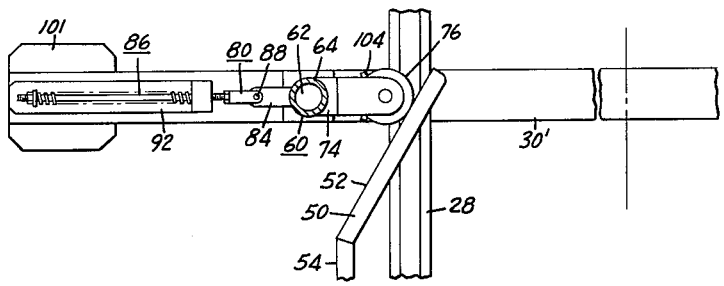
Fig. 6 is a fragmentary top plan view of an automatic idler structure as shown in Fig. 4 as it initially engages a side guide of the carriage as shown in Fig. 2.
Figure 7:
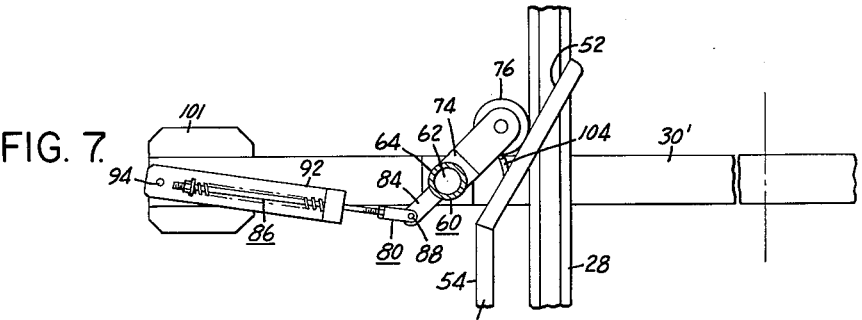
Fig. 7 is a fragmentary top plan view of an automatic idler structure as shown in Fig. 4 as it progresses along the front cam surface of the guide on the carriage as shown in Fig. 2.

Referring to Fig. 6 it will be noted that further forward movement of the carriage 20 causes the forward cam surfaces 52 to engage the inwardly facing edges of the spaced rollers 76 of the approached idlers 60. As shown in Fig. 7 still further forward movement of the carriage 20 causes the rollers 76 to be displaced laterally outwardly and forwardly by their engagement with the forward cam surfaces 52 so that the supports 64 are pivoted about the posts 62. It will be obvious that such forward pivotable movement of the supports 64 will cause a correspondingly forward pivotable movement of the supports 66 and rollers 68 supported thereby away from the carriage 20. At the same time the links 84 connected to the pivotable supports 64 are pivoted inwardly of the passageway 16 to cause the toggle mechanisms 80 to move so that the pivot connection 88 therebetween is moved forwardly out of alignment with the heretofore discussed aligned pivot connections.

Figure 8:
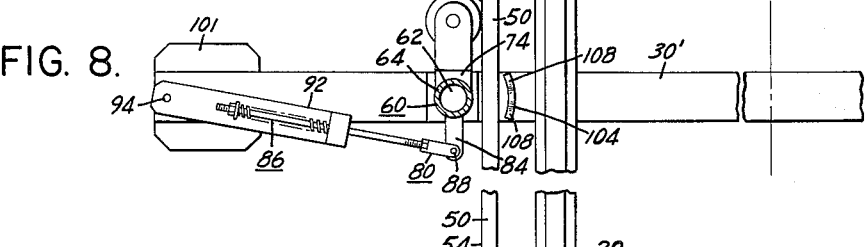
Fig. 8 is a fragmentary top plan view of an automatic idler structure as shown in Fig. 4 as fully displaced by the side guide on the carriage as shown in Fig. 2.
Figure 9:
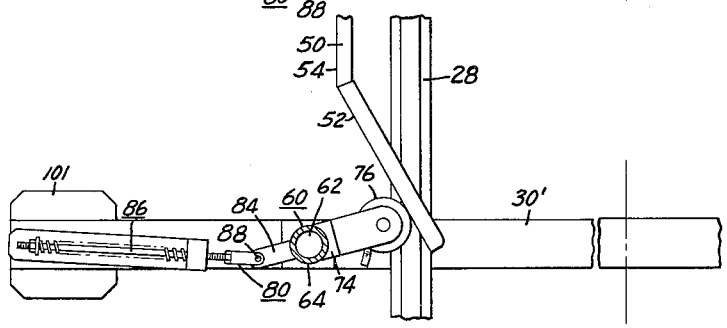
Fig. 9 is a fragmentary top plan view of an automatic idler structure as shown in Fig. 4 as it progresses along the back cam surface on the carriage as shown in Fig. 2.

As shown in Fig. 8 still further forward movement of the carriage 20 causes the rollers 76 to pass over the forward cam surface 52 onto the outwardly disposed side surfaces 54 of the guides 50. It will be noted that the rollers 76 are of a sufficient diameter and that the surfaces 54 of the guides 50 are disposed with relation to each other so that when they are engaged the pivot pins 88 have been displaced 90° and the links 84 and the brackets 74 extend longitudinally adjacent the rails 28. The rollers 76 continue to roll along the outer surface 54 as the carriage 20 moves forwardly until the inner or rearward cam surfaces 52 are engaged (see Fig. 9) at which time the rollers 76, due to the spring bias of the toggle mechanism 80, are displaced inwardly towards the adjacent rail 28 on the rearward cam surfaces 52 in the reverse manner as heretofore described.

In view of the fact that the rollers 68 are supported on the supports 66 which in turn are rigidly secured to the pivoting supports 64 it will be obvious that the supports 66 will pivot in the same manner as the rollers 76 so that the supports 66 and rollers 68 are initially swung laterally outwardly from the path of the forward traveling carriage 20 until they assume a position parallel to the center of the runs 15 and 17. Upon passage of the carriage 20 beyond the pivoting supports 64 the supports 66 swing inwardly behind the carriage 20 to their normal belt supporting position although, since the carriage 20 has passed thereby, the rollers 68 no longer support the run 15. It is readily apparent that although Figs. 6-9 show only one side guide 50 and the cooperation of the toggle mechanism 80 and roller 76 therewith, that all other idlers 60 will operate in the same manner. It is also equally apparent that the above described swiveling of the supports 64 will occur regardless of which direction the carriage 20 is traveling in due to the fact that the cam surfaces 52 are located at each end of the guide 50 and in view of the fact that the toggle mechanisms 80 may be displaced to either side of the supports 64. Thus in the event that the tail section 8 approaches the turn unit 18 the tensioning unit 21 will exert a greater tension on the carriage 20 than will the conveying runs 15 and 17 so that the carriage 20 is pulled inwardly of the passageway 16. Upon such inward travel of the carriage 20 past a pair of spaced idlers 60 the rollers 68 will again be laterally displaced outwardly and then swing inwardly beneath the run 15 to support the undersurface of the run 15. It will also be apparent that the posts 62 must be laterally spaced outwardly from the adjacent rails 28 a sufficient distance to readily permit the supporting arms 40 to pass therebetween.

Although as described the passageway 16 extends laterally of the passageway 6, it will be appreciated that if desired a passageway 16' extending in alignment with the passageway 6 from the other side of the passageway 2 may be provided in which to locate the storage runs 15 and 17 or that a lateral passageway 16" to the other side of the passageway 6 may be employed. Also, although a hydraulic tensioning unit 21 has been described, if desired, a suitable mobile mounted tensioning means may be employed.

Although I have shown and described one particular form of conveyor apparatus which incorporates the various features of my invention, in accordance with the patent statutes, I am aware that modifications may be made therefrom without departing from the spirit and scope of my invention. Accordingly, it is desired that the invention be not limited to the particular form of conveyor apparatus or use thereof specifically illustrated and described herein, but that the invention should be given a broad scope and be limited only as required by the prior art.

What I claim is:

1. Conveyor apparatus comprising, an elongated loop portion of a continuously movable conveyor belt having its closed end movably supported by support means which is reciprocable along an elongated path axially of said loop portion to vary the length of said loop portion, said loop portion having its ends remote from said closed end adapted to be connected to apparatus whereby a variable force is exerted upon said support means axially of said path through the runs of said loop portion, said support means including means constantly urging said loop portion in the direction of maximum length whereby an approximately uniform axial tension is maintained in said loop portion, a plurality of pivotable means each located in part laterally outwardly of said path and in part to extend laterally across said path which latter part supports one run of said loop portion in spaced relationship to the other run of said loop portion, said plurality of pivotable means being spaced longitudinally of said path to support the entire length of said one run, and means on said support means successively engageable upon said reciprocable movement thereof with a portion of said longitudinally spaced pivotable means to successively pivotably displace said latter parts thereof from said path to permit variations in the length of said loop portion.

2. Conveyor apparatus comprising, an elongated loop portion of a continuously movable conveyor belt having its closed end movably supported by support means which is reciprocable along an elongated path axially of said loop portion to vary the length of said loop portion, said loop portion having its ends remote from said closed end adapted to be connected to apparatus whereby a variable force is exerted upon said support means axially of said path through the runs of said loop portion, said support means including means constantly urging said loop portion in the direction of maximum length whereby an approximately uniform axial tension is maintained in said loop portion, a plurality of pivotable means each located in part laterally outwardly of said path and in part to extend laterally across said path which latter part supports one run of said loop portion in spaced relationship to the other run of said loop portion, said plurality of pivotable means being spaced longitudinally of said path to support the entire length of said one run, means on said support means successively engageable upon said reciprocable movement thereof with a portion of said longitudinally spaced pivotable means to successively pivotably displace said latter parts thereof from said path to permit variations in the length of said loop portion, each of said pivotable means including means for biasing said latter part thereof to so extend laterally across said path, and said means on said support engageable with said portion of said pivotable means being of a length to remain in such engagemet throughout the movement of said support means by a given pivotable means to overcome the bias of said biasing means for said given pivotable means.

3. Conveyor apparatus comprising, an elongated loop portion of a continuously movable conveyor belt having its closed end movably supported by support means which is reciprocable along an elongated path axially of said loop portion to vary the length of said loop portion, said loop portion having its ends remote from said closed end adapted to be connected to apparatus whereby a variable force is exerted upon said support means axially of said path through the runs of said loop portion, said support means including means constantly urging said loop portion in the direction of maximum length whereby an approximately uniform axial tension is maintained in said loop portion, a plurality of pivotable means each located in part laterally outwardly of said path and in part to extend laterally across said path which latter part supports one run of said loop portion in spaced relationship to the other run of said loop portion, said plurality of pivotable means being spaced longitudinally of said path to support the entire length of said one run, means on said support means successively engageable upon said reciprocable movement thereof with a portion of said longitudinally spaced pivotable means to successively pivotably displace said latter parts thereof from said path to permit variations in the length of said loop portion, each of said pivotable means including means for biasing said latter part thereof to so extend laterally across said path, and said means on said support engageable with said portion of said pivotable means being of a length to remain in such engagement throughout the movement of said support means by a given pivotable means to overcome the bias of said biasing means for said given pivotable means and means on said support means engageable with said one run to support said one run out of engagement with said latter part of said given pivotable means as said latter part of said given pivotable means moves in and out of said laterally extending location.

4. Conveyor apparatus comprising, an elongated loop portion of a continuously movable conveyor belt having its closed end movably supported by support means which is reciprocable along an axially of said path to vary the length of said loop portion, said loop portion having its ends remote from said closed end adapted to be connected to apparatus whereby a variable force is exerted upon said support means axially of said path through the runs of said loop portion, said support means including means constantly urging said loop portion in the direction of maximum length whereby an approximately uniform axial tension is maintained in said loop portion, a plurality of pivotable means each located in part laterally outwardly of said path and in part to extend laterally across said path which latter part supports one run of said loop portion in spaced relationship to the other run of said loop portion, said plurality of pivotable means being spaced longitudinally of said path to support the entire length of said one run, means on said support means successively engageable upon said reciprocable movement thereof with a portion of said longitudinally spaced pivotable means to successively pivotably displace said latter parts thereof from said path to permit variations in the length of said loop portion, and means on said support means engageable with said one run to support said one run out of engagement with said latter part of a given pivotable means at least prior to and during the period said support means passes by said given pivotable means.

5. Conveyor apparatus comprising, a movable belt supporting carriage supported for reciprocable movement in a path over a surface, elongated engaging means secured to at least one part of said carriage to extend parallel to the center of said path and located outwardly therefrom to define an outer side of said path, support structures spaced laterally outwardly from said side of said path and longitudinally therealong, each of said support structures having an elongated support member pivotable about a longitudinal axis extending upwardly above said surface, each of said support members having a pair of laterally projecting means secured thereto in longitudinally spaced relationship, at least one of said laterally projecting means on each of said support members normally being located in said side of said path, the other of said laterally projecting means on each of said support members being adapted to support a run of movable belt extending from and supported by said carriage, and said ones of said laterally projecting means being successively engaged by said engaging means upon said reciprocable movement of said carriage to cause said other laterally projecting means to be removed from said path.

6. Conveyor apparatus comprising, a movable belt supporting carriage supported for reciprocable movement in a path over a surface, engaging means secured to said carriage and extending outwardly therefrom which define a quadrangular periphery around said carriage with elongated spaced sides of said periphery being located parallel to the center of said path, support structures spaced laterally outwardly from the center of said path a greater distance than said spaced sides, respectively, each of said support structures having an elongated support member pivotable about a longitudinal axis extending upwardly above said surface, each of said support members having a pair of laterally projecting means secured thereto in longitudinally spaced relationship, said laterally projecting means of said support members normally being located in opposed spaced relationship to each other, at least one of said laterally projecting means on each of said support members normally being located in said carriage path, the other of said laterally projecting means on each of said support members being adapted to support a run of movable belt extending from and supported by said carriage, and said ones of said laterally projecting means being located with respect to said path to engage said engaging means upon said reciprocable movement of said carriage to cause said other laterally projecting means to be removed from said path.

7. Conveyor apparatus as defined in claim 6 in which each of said spaced sides are provided with a cam surface at each end thereof to initially engage and guide the cooperable one of said laterally projecting means outwardly to said spaced side.

8. Conveyor apparatus comprising, a support having a base portion adapted to be stationarily supported with reference to a surface, an elongated member supported by said support to extend upwardly from said base portion and for pivotable movement about a longitudinal axis thereof, an elongated support secured to said elongated member to be pivotable therewith above said base portion, engageable means secured to said elongated member to be pivotable therewith, said engageable means and said elongated support extending laterally outward from one side of said elongated member, and yieldable means for normally biasing said elongated member into a given position with respect to said support.

9. Conveyor apparatus comprising, a support having a base portion adapted to be stationarily supported with reference to a surface, an elongated member supported by said support to extend upwardly from said base portion and for pivotable movement about a longitudinal axis thereof, an elongated support secured to said elongated member to be pivotable therewith above said base portion, belt supporting means secured to said elongated support to be pivotable therewith, engageable means secured to said elongated member to be pivotable therewith, said engageable means and said elongated support being longitudinally spaced with respect to and extending laterally outward in one direction from said elongated member, and yieldable means for normally biasing said elongated member into a given position with respect to said support.

10. Conveyor apparatus comprising, a support having a base portion adapted to be stationarily supported with reference to a surface, an elongated member supported by said support to extend upwardly from said base portion and for pivotable movement about a longitudinal axis thereof, an elongated support secured to the upper end of said elongated members to be pivotable therewith, belt supporting means secured to said elongated support to be pivotable therewith, engageable means secured to said elongated member intermediate its ends to be pivotable therewith, said engageable means and said elongated support extending laterally outward from one side of said elongated member, and yieldable means for normally biasing said elongated member into a given position with respect to said support.

11. Conveyor apparatus comprising, spaced supports each having a base portion adapted to be stationarily supported with reference to a surface, elongated members supported by said spaced supports to extend upwardly from said base portions and for pivotable movement about longitudinal axes thereof, respectively, elongated supports secured to said elongated members above said base portions to be pivotable with said elongated members, respectively, said elongated supports having belt supporting means secured thereto, respectively, engageable means secured to said elongated members to be pivotable therewith, respectively, said engageable means and said elongated supports extending laterally outwardly from one side of said elongated members, respectively, and yieldable means for normally biasing said elongated members into a position so that said elongated supports extend towards each other.

12. Conveyor apparatus comprising, a pair of side structures each comprising a support having a base portion adapted to be stationarily supported with reference to a surface, an elongated member supported by said support to extend upwardly from said base portion and for pivotable movement about a longitudinal axis thereof, an elongated support secured to said elongated member above said base portion to be pivotable therewith, belt supporting means secured to said elongated support to be pivotable therewith, engageable means secured to said elongated member to be pivotable therewith, said engageable means and said elongated support being longitudinally spaced in respect to and extending laterally outward in one direction from said elongated member, yieldable means for normally biasing said elongated member into a given position; and said side structures being spaced from each other with the free ends of said elongated supports located closely adjacent each other.

13. Conveyor apparatus comprising, a support having a base portion adapted to be stationarily supported with reference to a surface, an elongated member supported by said support to extend upwardly from said base portion and to pivot about a longitudinal axis thereof, an elongated support and engageable means secured to said elongated member above said base portion to be pivotable therewith, said engageable means and said elongated support being longitudinally spaced in respect to and extending laterally outward from one side of said elongated member, intermediate means extending from the other side of said elongated member having spaced portions pivotably connected to said base portion and said elongated member, respectively, to form a toggle mechanism with said elongated member being one pivotable link thereof, and yieldable means connected to said toggle mechanism to bias said toggle mechanism with the pivot connection between said elongated member and said intermediate means in alignment with the pivot ends of said toggle mechanism.

14. Conveyor apparatus comprising, a support having a base portion adapted to be stationarily supported with reference to a surface, an elongated member supported by said support to extend upwardly from said base portion and to pivot about a longitudinal axis thereof, an elongated support and engageable means secured to said elongated member above said base portion to be pivotable therewith, said engageable means and said elongated support being longitudinally spaced in respect to and extending laterally in one direction from said elongated member, a connecting member rigidly secured to said elongated member to be pivotable therewith and to extend laterally therefrom in a direction opposite said one direction, an intermediate means extending in said opposite direction having spaced portions pivotally connected to said base portion and to said connecting member, respectively, to form a toggle mechanism, and yieldable means for biasing said toggle mechanism so that the pivot connection between said connecting member and said intermediate means is normally in alignment with the pivot ends of said toggle mechanism, 15. Conveyor apparatus comprising, a movable belt supporting carriage supported for reciprocable movement in a path over a surface, engaging means secured to said carriage and extending outwardly therefrom which define a quadrangular periphery around said carriage with spaced sides of said periphery being located parallel to the center of said path, support structures spaced laterally outwardly from the center of said path a greater distance than said spaced sides, respectively, each of said support structures having an elongated support member pivotable about a longitudinal axis extending upwardly above said surface, each of said support members having a pair of laterally projecting means secured thereto in longitudinally spaced relationship, said laterally projecting means of said support members normally being located in opposed spaced relationship to each other, at least one of said laterally projecting means on each of said support members normally being located in said carriage path, the other of said laterally projecting means on each of said support members being adapted to support a run of movable belt extending from and supported by said carriage, said one laterally projecting means being located with respect to said path to engage said engaging means, respectively, upon said reciprocable movement of said carriage to cause said other laterally projecting means to be removed from said path, and said carriage having means supporting said run of movable belt whereby said belt is removed from said other laterally projecting means prior to the removal of said other laterally projecting means from said path.

16. Conveyor apparatus comprising, support means for supporting the closed end of an elongated loop portion of a continuously movable conveyor belt, said support means being reciprocable along an elongated path axially of said loop portion to vary the length of said loop portion, a plurality of other support means each having a movable portion extending in part across said path which movable portions support one run of said loop portion in spaced relationship to the other run of said loop portion, said plurality of other support means being spaced longitudinally of said path, and means on said support means successively engageable upon said reciprocable movement thereof with said other support means to successively move said movable portions from said path to permit variations in the length of said loop portion.

17. Conveyor apparatus comprising, support means for supporting the closed end of an elongated loop portion of a continuously movable conveyor belt, said support means being reciprocable along an elongated path axially of said loop portion to vary the length of said loop portion, a plurality of other support means each having a movable portion extending in part across said path which movable portions support one run of said loop portion in spaced relationship to the other run of said loop portion, said plurality of other support means being spaced longitudinally of said path, and means on said support means successively engageable upon said reciprocable movement thereof with means on said longitudinally spaced other support means to successively move said movable portions from said path to permit variations in the length of said loop portion.

18. Conveyor apparatus as defined in claim 17 in which said other support means has additional means engageable with said one run to support said one run out of engagement with said movable portions of said other support means at least prior to and during the period said support means passes by said other support means, respectively.

19. Conveyor apparatus as defined in claim 17 in which each of said other support means includes means for biasing said movable portion to so extend across said path.

20. Conveyor apparatus comprising, support means for supporting the closed end of an elongated loop portion of a continuously movable conveyor belt, said support means being reciprocable along an elongated path axially of said loop portion to vary the length of said loop portion, a plurality of other support means each having a pivotably movable portion extending in part across said path which pivotably movable portions support one run of said loop portion in spaced relationship to the other run of said loop portion, said plurality of other support means being spaced longitudinally of said path, and means on said support means successively engageable upon said reciprocable movement thereof with said other support means to successively pivotably displace said pivotably movable portions from said path to permit variations in the length of said loop portion.

21. Conveyor apparatus comprising, an elongated loop portion of a continuously movable conveyor belt having its closed end movably supported by support means which is reciprocable along an elongated path axially of said loop portion to vary the length of said loop portion, said loop portion having its ends remote from said closed end adapted to be connected to apparatus whereby a variable force is exerted upon said support means through the runs of said loop portion, said support means including means constantly urging said loop portion in the direction of maximum length whereby an approximately uniform tension is maintained in said loop portion, a plurality of other support means each having a pivotable portion located in part to extend laterally across said path which pivotable portions support one run of said loop portion in spaced relationship to the other run of said loop portion, said plurality of other support means being spaced longitudinally of said path, and means on said support means successively engageable upon said reciprocable movement thereof with additional means on said other support means to successively pivotably displace said pivotable portions from said path to permit variations in the length of said loop portion.

22. Conveyor apparatus comprising, a movable belt supporting carriage supported for reciprocable movement in a path over a surface, said carriage having engaging means which is movable therewith along one side of said path, support structures spaced laterally outwardly from said one side of said path and longitudinally therealong, each of said support structures extending upwardly above said surface and having a pair of longitudinally spaced unitarily movable projecting means, one of said projecting means on each of said support members normally extending into said path from said one side to support a run of movable belt extending from and supported by said carriage, and the other of said projecting means being successively engaged by said engaging means upon said reciprocable movement of said carriage to cause said one projecting means to be removed from said path.

References Cited in the file of this patent

UNITED STATES PATENTS

| | | |
|---|---|---|
| 2,725,757 | Murphy | Dec. 6, 1955 |
| 2,725,976 | Madeira | Dec. 6, 1955 |
| 2,781,893 | Milik | Feb. 19, 1957 |

FOREIGN PATENTS

| | | |
|---|---|---|
| 689,075 | Great Britain | Mar. 18, 1953 |